United States Patent [19]

Elliott

[11] 4,326,284
[45] Apr. 20, 1982

[54] VIDEO DISC PLAYER HAVING TURNTABLE ASSIST APPARATUS

[75] Inventor: Charles A. Elliott, Indianapolis, Ind.

[73] Assignee: RCA Corporation, New York, N.Y.

[21] Appl. No.: 148,304

[22] Filed: May 9, 1980

[51] Int. Cl.³ .............................................. G11B 17/00
[52] U.S. Cl. ...................................... 369/77; 369/268; 369/270
[58] Field of Search ................. 369/77, 219, 225, 262, 369/264, 268, 270; 360/97, 133

[56] References Cited
U.S. PATENT DOCUMENTS

| 1,145,793 | 7/1915 | Preuss | 369/268 |
| 2,905,475 | 9/1959 | Cheeseboro | 369/77 |
| 2,943,861 | 7/1960 | Redfield | 369/77 |
| 3,940,148 | 2/1976 | Torrington et al. | 369/268 |
| 4,073,496 | 2/1978 | Barlow | 369/77 |

Primary Examiner—John W. Shepperd
Attorney, Agent, or Firm—E. M. Whitacre; J. S. Tripoli; D. A. Kulkarni

[57] ABSTRACT

In video disc players, a turntable is raised and lowered by means of an actuating cam to transfer a record retained inside the player between the turntable and a record receiving means. A spring-loaded member is disposed underneath the turntable for engagement therewith as the turntable is lowered for reducing the force exerted by the turntable on the actuating cam.

2 Claims, 6 Drawing Figures

VIDEO DISC PLAYER HAVING TURNTABLE ASSIST APPARATUS

This invention relates to disc record players, and more particularly, to players wherein a disc record is exchanged between a record receiving means and a turntable.

In certan systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type video disc system is illustratively disclosed in U.S. Pat. No. 3,842,194 (Clemens).

To protect the video disc record, it is beneficial to enclose it in a caddy which comprises an outer jacket and a record retaining spine. For record loading, a full caddy is inserted into an input slot provided in the player. A record extraction mechanism disposed in the player removes the record/spine assembly from the jacket for retention in the player during subsequent jacket withdrawal. The retained record/spine assembly is supported in the player on a set of receiving pads. To transfer the record to the turntable for playback the turntable is raised relative to the receiving pads. The record player is provided with hold-down members which hold the retained spine in place while allowing the retained record to be picked up by the turntable when it is raised. During playback, the pickup stylus is traversed radially across the record while the turntable spins the record at the desired speed (e.g., 450 rpm). For record retrieval, the record is transferred back to the receiving pads by lowering the turntable with respect to the receiving pads to redefine the record/spine assembly. An empty jacket is then inserted into the player, whereby the record/spine assembly is returned back into the jacket. Withdrawal of the caddy from the player effects record retrieval. Reference is made to U.S. patent application, Ser. No. 122,959, entitled "STYLUS CLEANING APPARATUS FOR VIDEO DISC PLAYER", and filed in the name of L. M. Hughes et al, for an example of a video disc player of the type mentioned above.

In such systems, it is desirable to use a slidably-mounted cam which is disposed in engagement with a central shaft secured to the turntable for effecting the raising and lowering of the turntable. The player is further equipped with a selectively-actuated function lever for causing a to-and-fro motion of the cam. A problem with this arrangement is that the actuating cam exerts excessive side thrust on the turntable bearings. Another accompanying problem is that an uncomfortable feel of the function lever results because of the static friction that must be overcome at the outset. The force required to operate the function lever decreases rapidly as the turntable shaft rides up the cam. Because of the non-linear force requirements, the task of detenting the function lever becomes difficult.

The apparatus in accordance with this invention overcomes the aforementioned difficulties. A spring-loaded member is disposed underneath the turntable for engagement therewith as the turntable is lowered so as to reduce the force exerted by the turntable on the actuating cam.

Figure 1:
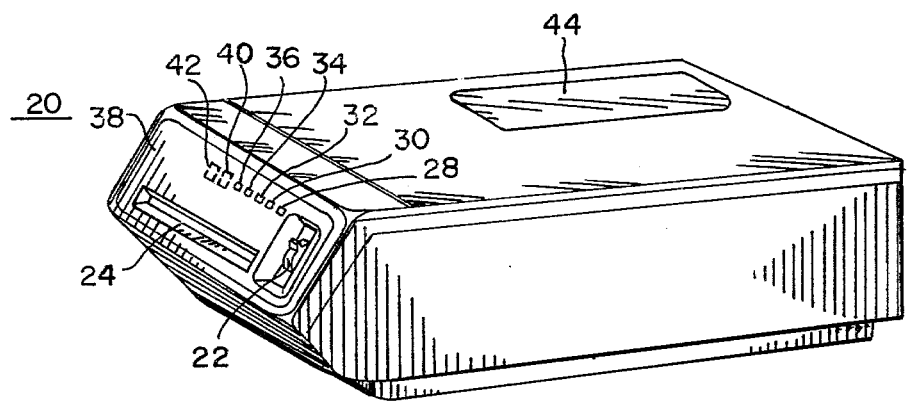
FIG. 1 shows the video disc player incorporating the turntable assist apparatus according to the instant invention.
Figure 3:
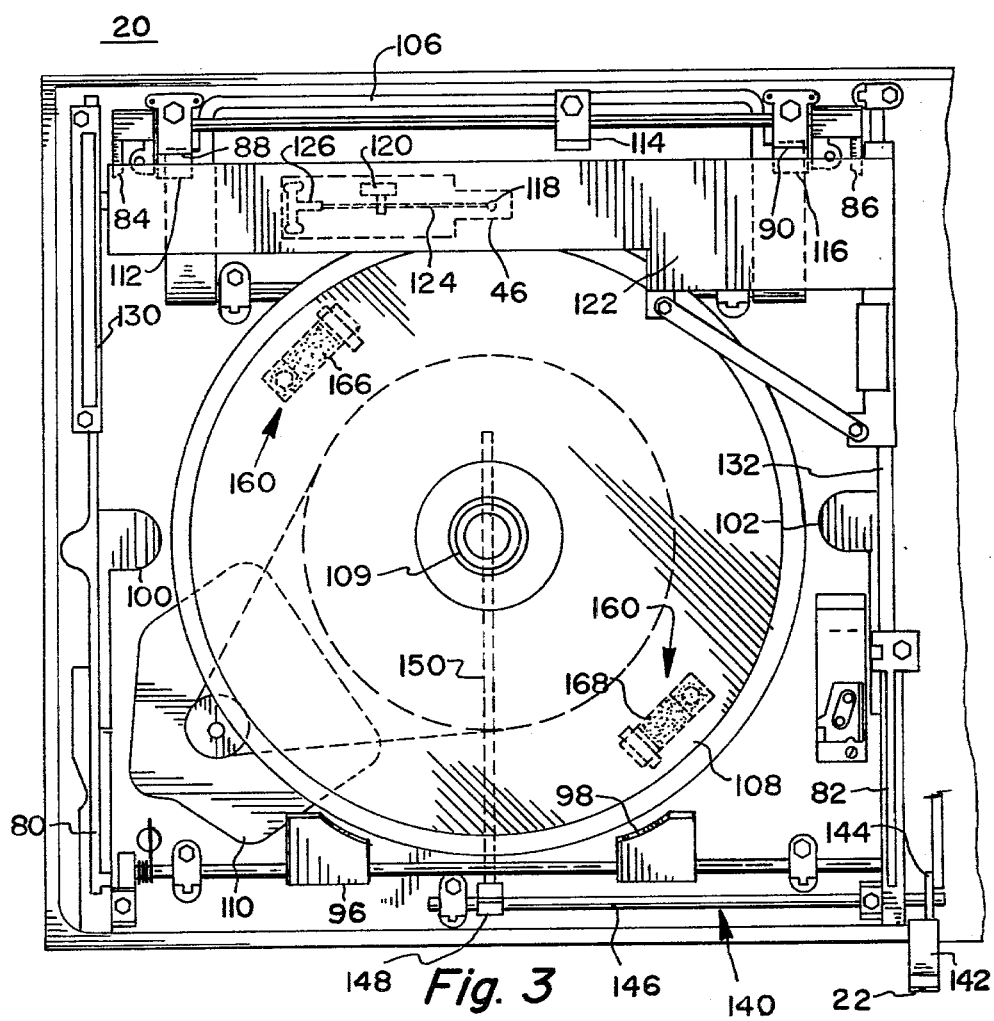
Figure 6:
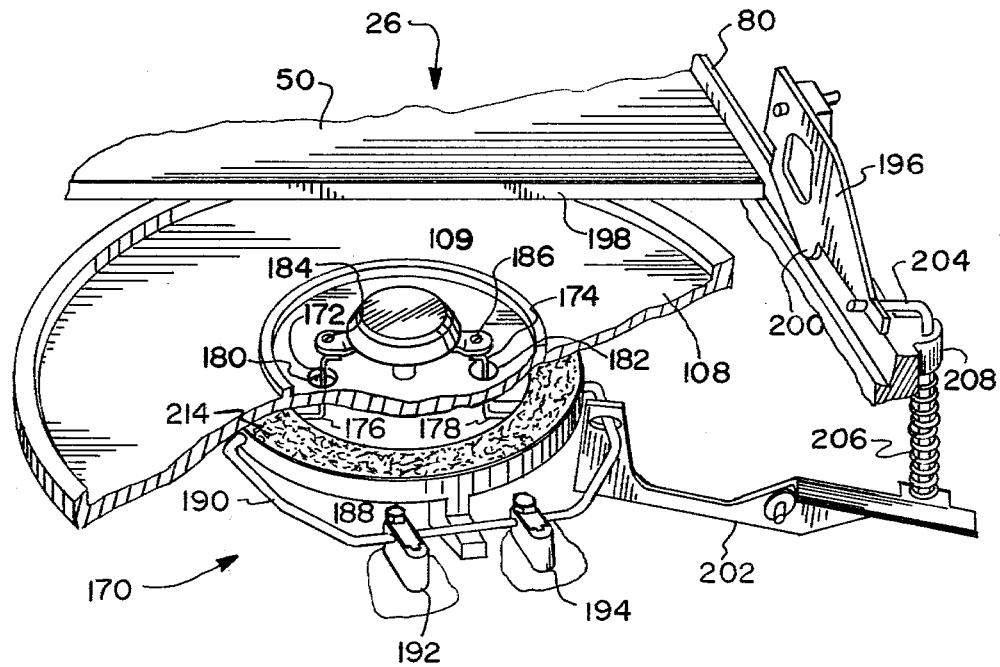
Figure 4:
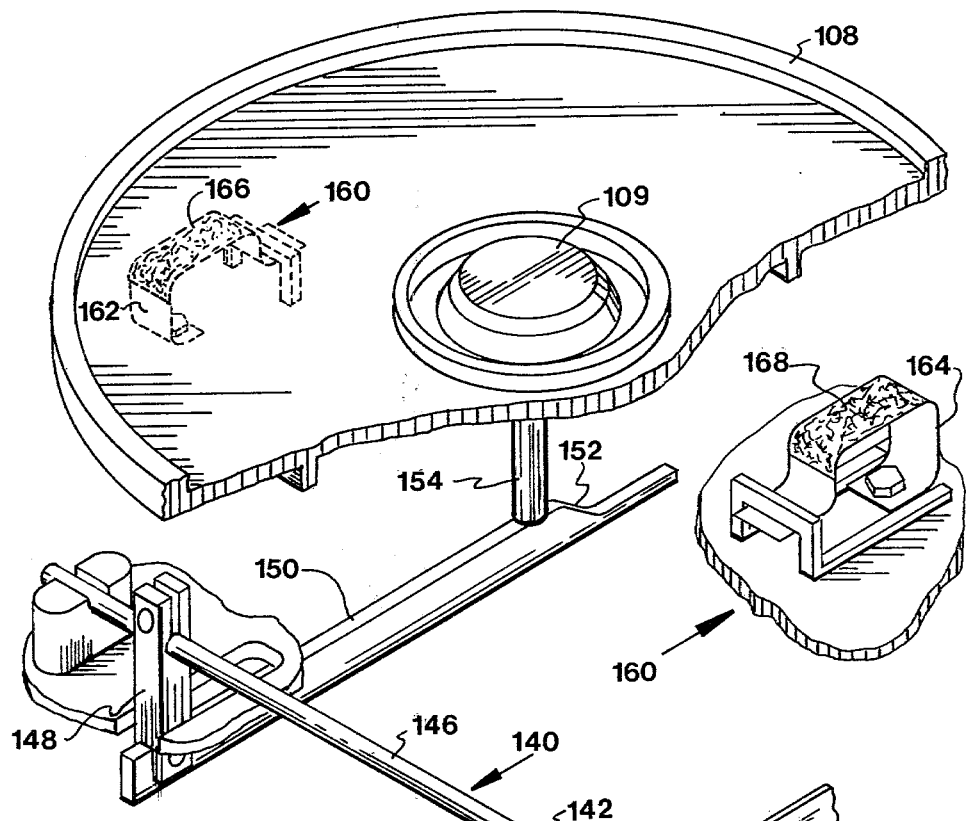
Figure 5:
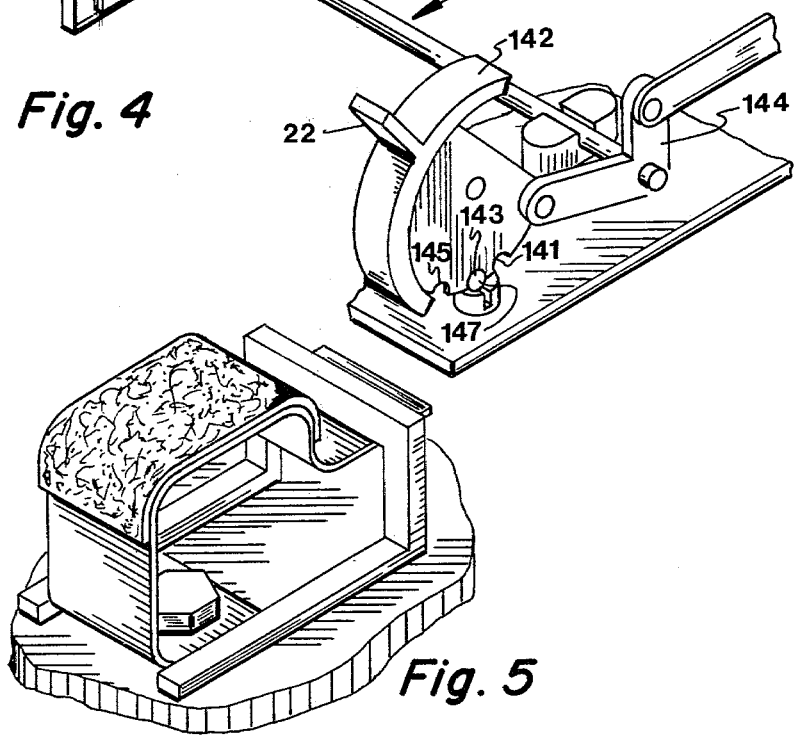

FIG. 3 provides a plan view of the video disc player showing the turntable assist apparatus of FIG. 1 including a pair of leaf springs;

FIG. 4 gives a perspective view of the instant turntable assist apparatus;

FIG. 5 shows an enlarged view of one of the leaf springs of the turntable assist apparatus of FIGS. 3 and 4; and FIG. 6 depicts another embodiment of this invention.

Shown in FIG. 1 is a video disc player 20 having the subject turntable assist apparatus. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". An access door 44 is disposed on the cover of the player to provide access to a stylus cartridge 46 (FIG. 3).

Figure 2:
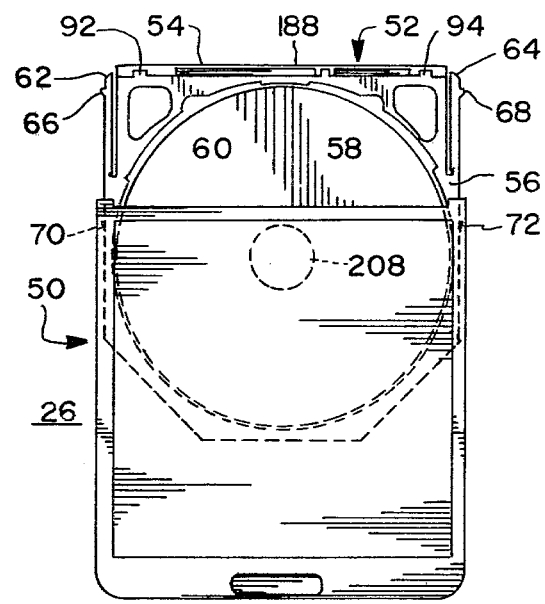
FIG. 2 illustrates a video disc caddy suitable for use with the player of FIG. 1.

As shown in FIG. 2, the video disc caddy 26 comprises a jacket 50 having an edge opening and a substantially planar, record retaining spine 52. The spine 52 has a portion 54 which serves as a closure when the spine is fully inserted into the jacket, and a further portion 56 having a circular opening 58 for receiving a record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein.

The operation of the caddy extraction mechanism will be first explained in conjunction with FIG. 3. To load a record into the player, a caddy is inserted into the input slot 24 along a path defined by guideways 80 and 82. As the caddy arrives at a fully inserted position in the player, latch defeat members 84 and 86 enter the jacket 50 to defeat the spine latch fingers 62 and 64 for freeing the spine 52 from the jacket. Pivotally mounted in the player are spine gripper members 88 and 90 which are received in respective cutouts 92 and 94, arranged in the spine 52, when the caddy arrives at the fully inserted position in the player in order to lock the spine to the player. Since the spine 52 is released from the jacket 50 through the operation of the latch defeat members 84 and 86 and is latched to the player through the operation of the spine gripper members 88 and 90, subsequent withdrawal of the jacket leaves the record/spine assembly in the player. The spring-loaded receiver pads 96, 98, 100, 102 and 104 serve to accurately locate the retained spine/record assembly in the player. A pair of springs (not shown) disposed between a gripper arm 106, which carries the spine gripper members 88 and 90, and the latch defeat members 84 and 86 effect downward deflection of the latch defeat members during jacket withdrawal.

To transfer the retained record to a turntable 108, the function lever 22 is moved to the PLAY position, which, in turn, raises the turntable and starts a turntable motor 110. A turntable spindle 109 engages the center hole of the record as the turntable 108 is raised to assure proper record alignment. The turntable lifting/lowering mechanism 140 will be described in more detail later. A set of hold-down members 112, 114 and 116 hold the retained spine 52 in place against the receiver pads 96–104 while permitting the retained record to be picked up by the turntable 108 when it is raised. The hold-down members 112–116 also serve to accurately locate the retained spine 52, longitudinally and laterally, in the player. A pickup stylus 118 is gently lowered onto the information track disposed on the record by means of a stylus lifter 120 (for example, of the type described in U.S. Pat. No. 4,053,161) mounted in a carriage 122. The pickup stylus 118 is disposed at one end of a stylus arm 124. The other end of the stylus arm 124 is secured to the cartridge 46 by means of a rubber coupler 126. Disposed in the bottom wall of the carriage 122 is an opening 128 through which the stylus 118 is selectively lowered for record engagement. During playback, the carriage 122 is translated on guiderails 130 and 132 disposed parallel to the caddy guideways 80 and 82 from a starting position at the back of the player toward the front of the player in response to the radially inward motion of the pickup stylus 118 and in a direction disposed opposite to the direction of insertion of the caddy into the player. The recovered signals are processed to reconstruct a standard television signal containing picture and sound information for application to a television receiver.

To transfer the record back to the receiver pads 96–104 after playback, the function lever 22 is shifted back to the LOAD/UNLOAD position, which, in turn, lowers the turntable 108 to a level below the receiver pads. When the turntable 108 is lowered, the record, which is still spinning, is deposited on the receiver pads 96–104 for reception in the opening 58 disposed in the spine 52. The turntable motor 110 is shut off when the function lever 22 is displaced to the LOAD/UNLOAD position. To retrieve the record/spine assembly, the empty jacket 50 is inserted into the player through the input slot 24 along the guideways 80 and 82. As the jacket 50 arrives at the fully inserted position in the player, the front edge thereof engages the already deflected latch defeat members 84 and 86 to cause further downward deflection thereof. Such further downward deflection of the latch defeat members 84 and 86, in turn, effects downward displacement of the spine gripper members 88 and 90, whereby the spine 52 is freed from the player. When the jacket 50 is fully inserted into the player, the spine latch fingers 62 and 64 snap back into the pockets 70 and 72 to lock the spine 52 to the jacket. The record/spine assembly is withdrawn from the player when the caddy is extracted.

The turntable lifting/lowering mechanism 140 will now be described in more detail in conjunction with FIG. 4. The function lever 22, which operates the turntable lifting/lowering mechanism 140, is arranged on a disc-shaped member 142 rotatably mounted in the player. The disc-shaped member 142 is provided with indentations 141, 143 and 145 corresponding to three positions of the function lever (i.e., OFF, PLAY and LOAD/UNLOAD). A detent 147 is subject to engagement with the indentations 141, 143 and 145 disposed on the disc-shaped member 142 to selectively latch the function lever 22 at the desired positions. An elbow 144 disposed at one end of a rotatably-mounted rod 146 transmits motion of the disc-shaped member 142 to an actuating arm 148 attached at the other end of the rod. The actuating arm 148 is coupled to one end of a slider cam 150 which is translatably mounted in the player for back-and-forth motion. The other end of the slider cam 150 defines a ramp 152 which is disposed in the region underneath the turntable shaft 154.

To raise the turntable 108, the function lever 22 is rotated from the LOAD/UNLOAD positin to the PLAY position, which, in turn, displaces the slider cam 150 forward. As the slider cam 150 is pushed forward, the turntable shaft 154 rides up the ramp 152 to elevate the turntable 108. FIG. 4 shows the turntable 108 in the raised position. To lower the turntable 108, the slider cam 150 is retracted by displacing the function lever 22 back to the LOAD/UNLOAD position.

The instant turntable assist apparatus 160 will now be described. A pair of leaf springs 162 and 164 are disposed underneath the turntable 108 for engagement with the underside thereof when the turntable is lowered. A floating effect takes place as the leaf springs 162 and 164 are deformed under the weight of the turntable assembly. The deflected lear springs 162 and 164 exert upward force on the turntable 108 as it is lowered, thereby diminishing the downward force exerted by the turntable assembly on the slider cam 150. When the turntable 108 reaches the lowermost position, the leaf springs 162 and 164 exert the maximum opposing force, whch represents the majority of the weight of the turntable assembly. As the turntable shaft 154 is driven up the ramp 152 by means of the function lever 22, the upward force exerted by the leaf springs 162 and 164 decreases, as does the force required to overcome the friction. The net effect of this force balancing is a smooth, linear feel of the function lever 22. Additionally, such force balancing facilitates detention of the function lever 22 at the desired postions. Furthermore, the reduction in the force exerted by the turntable assembly on the slider cam 150 reduces the side thrust on the turntable bearings.

Disposed on the leaf springs 162 and 164 are felt pads 166 and 168 which serve to decelerate the turntable 108 as it is lowered. The felt pads 166 and 168 also serve to soften the turntable landing. FIG. 5 shows an enlarged view of the leaf spring.

A further embodiment of the invention will be described in conjunction with FIG. 6 which shows a spindle retracting apparatus 170. When the turntable 108 is depressed to deposit the record onto the receiver pads 96–104, the record, which is still spinning, has a tendency to mislocate with respect to the opening 58 in the spine 52 disposed on the receiver pads, thereby preventing proper reception of the record in the spine. The spindle retracting apparatus 170 overcomes the above-mentioned misalignment problem.

The turntable 108 is secured to a tubular shaft which is journalled for rotation and translation in a bearing housing fixedly mounted to the base plate of the player. A record centering spindle 109 is disposed on a pin which is received in the central opening of the hollow turntable shaft. It will be seen that the spindle 109 is arranged coaxially with the turntable 108, and is subject to rotational and translational motion independent of the turntable. A bias spring, arranged between the spindle pin and a follower disposed in the hollow turntable shaft, urges the spindle 108 toward the raised position.

Disposed on the spindle pin is a circumferential groove defining a neck portion which is received in an aperture defined by cutouts disposed in a pair of yokes 172 and 174. The terminal portions 176 and 178 of the yokes 172 and 174 are threaded through opposing holes 180 and 182 in the turntable 108, and the yokes are secured to each other by means of screws 184 and 186. The terminal portions 176 and 178 of the yokes 172 and 174 are received underneath a pulldown ring 188. The pulldown ring 188 is pivotally mounted on a C-shaped frame 190 which, in turn, is pivotally secured to the base plate of the player by means of a pair of posts 192 and 194. The pivotal axes of the pulldown ring 188 and the supporting frame 190 are substantially perpendicular to the turntable axis.

An actuating cam 196 is pivotally mounted adjacent to the caddy guideway 80 such that the front edge 198 of the caddy 26 engages a portion 200 disposed on the cam 196 to raise the cam as the caddy is inserted into the player. A rocker arm 202, pivotally mounted to the base plate of the player, has its one end connected to the C-shaped frame 190 and its other end secured to the actuating cam 196 by means of a connecting link 204. A return spring 206, arranged between a boss 208 fixedly disposed on the back plate and the rocker arm 202, serves to bias the actuating cam such that it is normally disposed in the caddy insertion path. The return spring 206 also serves to bias the pulldown ring 188 toward the raised position. When the caddy 26 is inserted into the player, the actuating cam 196 is lifted out of the caddy insertion path. When the actuating cam 196 is lifted, the pulldown ring 188 is depressed and the spindle 109 is retracted.

The pulldown ring 188 is provided with a pair of extensions which, in cooperation with stops arranged on the base plate of the player, serve to limit the upward motion of the pulldown ring. A felt ring 214 is affixed to the pulldown ring 188. The felt ring 214 engages the underside of the turntable 108 when the turntable is lowered to cause deceleration of the turntable. The location of the stops is such that the felt ring 214, disposed on the pulldown ring 188, is spaced from the turntable 108 when the turntable is occupying the raised position to allow the rotation of the turntable free from interference by the pulldown ring.

In the second embodiment, the spring-loaded pulldown ring 188 serves the function of the leaf springs 162 and 164 of the first embodiment shown in FIGS. 3 and 4. The spindle retracting mechanism 170 is described in more detail in a copending, concurrently-filed, commonly-assigned U.S. patent application, Ser. No. 148,305, of L. M. Hughes et al., and entitled "SPINDLE RETRACTING MECHANISM FOR DISC RECORD PLAYER".

What is claimed is:

1. In a record player for recovering prerecorded information from a disc record; said player includng a turntable for rotatably supporting and centering said record for playback; said player having means for raising and lowering said turntable including a support member; apparatus comprising spring-loaded means subject to engagement with said turntable during translation of said turntable from a raised position to a lowered position for reducing the force exerted by said turntable on said support member; wherein said spring-loaded means comprises a spring-loaded member disposed underneath said turntable; said spring-loaded member being located such that it does not engage said turntable when said turntable is occupying said raised position to allow said turntable to rotate without hindrance from said spring-loaded member; a pad being disposed on said spring-loaded member for engagement with the underside of said turntable during said translation of said turntable from said raised position to said lowered position to effect deceleration of said turntable.

2. In a record player for recovering prerecorded information from a disc record; said player including a turntable for rotatably supporting and centering said record for playback; said player further including a receiving means for supporting a record loaded into said player; said player having means for raising said turntable to a position which is elevated relative to said receiving means to transfer said loaded record resting on said receiving means to said turntable for record playback, and for lowering said turntable to a position which is depressed with respect to said receiving means to transfer said loaded record back to said receiving means for record retrieval; said turntable raising/lowering means including a shaft coaxially secured to the underside of said turntable and resting on a selectively-actuated cam mounted in said player; said cam being subject to motion in a manner effecting translation of said turntable between said elevated position and said depressed position; apparatus comprising spring-loaded means subject to engagement with said turntable during translation of said turntable from said elevated position to said depressed position for reducing the force exerted by said turntable on said selectively-actuated cam; wherein said spring-loaded means comprises a spring-loaded member disposed underneath said turntable; said spring-loaded member being located such that it does not engage said turntable when said turntable is occupying said elevated position to allow said turntable to rotate without hindrance from said spring-loaded member; a pad being disposed on said spring-loaded member for engagement with the underside of said turntable during said translation of said turntable from said elevated position to said depressed position to effect deceleration of said turntable.

* * * * *

UNITED STATES PATENT AND TRADEMARK OFFICE
CERTIFICATE OF CORRECTION

PATENT NO. :   4,326,284
DATED       :   April 20, 1982
INVENTOR(S) :   Charles Anthony Elliott It is certified that error appears in the above—identified patent and that said Letters Patent is hereby corrected as shown below:

Col. 4, line 17, "positin" should be --position--.

Col. 4, line 31, "lear" should read --leaf--.

Col. 5, line 6, "108" should be --109--.

Signed and Sealed this

Thirty-first Day of August 1982

[SEAL]

Attest:

Attesting Officer

GERALD J. MOSSINGHOFF
Commissioner of Patents and Trademarks